(12) United States Patent
Brumback et al.

(10) Patent No.: US 7,720,243 B2
(45) Date of Patent: May 18, 2010

(54) ACOUSTIC ENHANCEMENT FOR BEHIND THE EAR COMMUNICATION DEVICES

(75) Inventors: Mark A. Brumback, Plano, TX (US); Dustin L. Potter, Sugar Land, TX (US); John S. Freeman, Collinsville, TX (US)

(73) Assignee: Synygis, LLC, Plano, TX (US)

( * ) Notice: Subject to any disclaimer, the term of this patent is extended or adjusted under 35 U.S.C. 154(b) by 888 days.

(21) Appl. No.: 11/546,604

(22) Filed: Oct. 12, 2006

(65) Prior Publication Data

US 2008/0089542 A1 Apr. 17, 2008

(51) Int. Cl.
H04R 25/00 (2006.01)
(52) U.S. Cl. .................... 381/328; 381/380; 381/381
(58) Field of Classification Search .............. 381/312, 381/322, 328, 329, 330, 380, 381, 382
See application file for complete search history.

(56) References Cited

U.S. PATENT DOCUMENTS

| | | |
|---|---|---|
| 4,532,649 A | 7/1985 | Bellafiore |
| 4,706,778 A | 11/1987 | Topholm |
| 4,712,245 A | 12/1987 | Lyregaard |
| 4,729,451 A | 3/1988 | Brander et al. |
| 4,870,689 A | 9/1989 | Weiss |
| 4,871,502 A | 10/1989 | LeBisch et al. |
| 4,984,277 A | 1/1991 | Bisgaard et al. |
| 5,006,055 A | 4/1991 | Lebisch et al. |
| 5,008,058 A | 4/1991 | Henneberger et al. |
| 5,056,204 A | 10/1991 | Bartschi |
| 5,068,902 A | 11/1991 | Ward |
| 5,121,329 A | 6/1992 | Crump |
| 5,121,333 A | 6/1992 | Riley et al. |
| 5,136,515 A | 8/1992 | Helinski |
| 5,201,007 A | 4/1993 | Ward et al. |
| 5,487,012 A | 1/1996 | Topholm et al. |
| 5,641,448 A | 6/1997 | Yeung et al. |
| 5,889,874 A | 3/1999 | Schmitt et al. |
| 6,129,174 A | 10/2000 | Brown et al. |

(Continued)

FOREIGN PATENT DOCUMENTS

BE 1010200 A3 3/1998

(Continued)

OTHER PUBLICATIONS

International Search Report—Counterpart Int'l Application No. PCT/US07/81278, Mar. 25, 2008.

(Continued)

*Primary Examiner*—Tuan D Nguyen
(74) *Attorney, Agent, or Firm*—Gary L. Bush; Mark D. Shelley, II; Andrews Kurth LLP (57) ABSTRACT

A device and method for tailoring the audio frequency response of a hearing instrument, such as a hearing aid, by altering the physical characteristics of the device to more accurately compensate for a user's specific hearing loss attributes. The device has a bore formed within its housing which provides a passage for the transmission of sound from the receiver of the hearing instrument toward the user's eardrum. The bore has a custom-designed geometric shape to emphasize desired sound frequencies and therefore produce a predetermined frequency response of sound in combination with any frequency response changes directed by the hearing instrument's circuitry.

20 Claims, 6 Drawing Sheets

U.S. PATENT DOCUMENTS

| | | |
|---|---|---|
| 6,275,596 B1 | 8/2001 | Fretz et al. |
| 6,484,842 B1 | 11/2002 | Widmer et al. |
| 6,533,062 B1 | 3/2003 | Widmer et al. |
| 7,016,512 B1 | 3/2006 | Feeley et al. |
| 7,162,323 B2 | 1/2007 | Brumback et al. |
| 7,421,086 B2 | 9/2008 | Bauman et al. |
| 2003/0139658 A1 | 7/2003 | Collier et al. |
| 2003/0152242 A1 | 8/2003 | Marxen et al. |
| 2004/0026163 A1 | 2/2004 | Widmer et al. |
| 2005/0222823 A1 | 10/2005 | Brumback et al. |
| 2006/0115105 A1 | 6/2006 | Brumback et al. |

FOREIGN PATENT DOCUMENTS

| | | |
|---|---|---|
| CA | 2076682 | 2/1998 |
| DE | 4041105 A1 | 6/1992 |
| EP | 0516808 B1 | 1/1996 |
| WO | 00/34739 A2 | 6/2000 |
| WO | 01/05207 A2 | 1/2001 |
| WO | 01/87001 A2 | 11/2001 |
| WO | 02/25995 A1 | 3/2002 |

OTHER PUBLICATIONS

Mead Killion, Earmold Options for Wideband Hearing Aids, Journal of Speech and Hearing Disorders, 1981, American Speech-Language-Hearing Association.

PCT Amendments Under Article 34, Rule 66.3 filed on Jun. 25, 2008 in connection with PCT/US2007/81278.

International Preliminary Examination Report of PCT/US2007/81278 dated Sep. 28, 2009.

International Search Report and Written Opinion of the International Searching Authority—Int'l Application No. PCT/US05/43331, Jan. 11, 2007.

ACOUSTIC ENHANCEMENT FOR BEHIND THE EAR COMMUNICATION DEVICES

BACKGROUND OF THE INVENTION

1. Field of the Invention

This invention relates to custom designed hearing instruments and other ear devices and methods for making them. Such hearing instruments include devices commonly called hearing aids. Other ear devices include, for example, musician's custom ear monitors and custom fit ear pieces for personal communication devices such as cell phones, PDAs, digital audio playback devices for music or portable audio/video equipment and custom fit language translators. More specifically, this invention relates to tailoring the physical characteristics of a hearing instrument to produce desired sound frequency responses.

2. Background Art

Current hearing instrument technology is based upon the analog or digital amplification of sound. Hearing instruments simply incorporate various mechanical and/or electrical technologies to assist the hearing impaired to hear amplified sound. As both the electronic and manufacturing technologies have advanced, however, these hearing instrument devices have become increasingly smaller and less onerous for the hearing impaired. Several types of hearing aid instruments are in use today, including, but not limited to, the "behind-the-ear" (BTE) and "in-the-ear" (ITE) hearing aids. The BTE hearing aid, for example, consists of an "ear hook" having an electronics module (i.e. a microphone, amplifier, receiver, etc.) worn primarily behind the ear while an ear canal tube carrying the amplified sound is directed into the wear's ear canal. Original BTE designs used an ear mold to hold the ear canal tube in the proper position within the wearer's ear canal. More recent BTE designs use a barb or other rigid attachment that extends outward from the ear canal tube and lodges behind the tragus to maintain the proper positioning of the ear canal tube within the wearer's ear canal. An advantage of the more recent BTE designs is that the wearer's ear canal is not occluded by an ear canal mold, which may block the passage of nearly all unamplified outside sounds.

Advances in hearing aid design have led to the development of miniature hearing aid housings which can be worn inside the ear rather than on the outside of the ear. These miniature housings fit within the canal portion of the wearer's ear and take the place of the BTE-type ear hook housing and tubing-connected ear mold. Because the entire hearing aid device is inserted within the wearer's ear, the wearer has the benefits of a functional hearing aid instrument which is less outwardly noticeable than traditional BTE designs. "In the ear" (ITE)-type hearing devices have grown in popularity in recent years, mainly because the wearer feels less stigmatized when the hearing instrument is more or less inconspicuous. However, ear canal occlusion can also be a problem with these more recent ITE-type hearing aid devices in which the entire electronics module (i.e. a microphone, amplifier, receiver, etc.) is located within the ear mold.

Many of the advances in hearing instrument technology continue to be spurred by the comfort needs of the wearer. For example, vent channels have been designed into many ear molds to mitigate the problem of ear canal occlusion. These vent channels extend through the ear piece and are intended to promote wearer comfort. The smallest vent, called a pressure vent, promotes wearer comfort by allowing air to enter the ear canal thereby maintaining atmospheric pressure in the ear canal while the ear piece is in place. Large vents, however, have an effect on the acoustic response of the device. A pressure vent has little effect on acoustic response. But vents with larger diameters reduce some of the low frequency sounds amplified by the hearing aid by providing an alternative path of lesser acoustic resistance. Larger vents also mitigate the occlusion effect caused by an ear piece that completely fills the outer portion of the ear canal. The occlusion effect occurs when bone-conducted sound vibrations from a speaker's own voice become trapped between the ear piece and the ear drum thus producing what is perceived by the speaker to be a "hollow" or "booming" sounding voice. Partial ear occlusion can be somewhat beneficial, however, in that feedback is reduced. Some hearing instrument manufacturers provide for venting of the ear mold shell, but the venting is generally limited to a few standard sizes because of geometric challenges and manufacturing inefficiencies. When custom hearing instruments or ear molds are produced, certain features of the instruments are standardized to better accommodate the capabilities of the assembly line process in the hearing instrument or ear mold production facility.

Rather than tailoring the physical characteristics of the hearing device to emphasize desired frequencies, the prior art has generally been concerned with electronically "tuning" the hearing device using the then available amplification circuitry. An audiometric evaluation is usually conducted to determine the user's frequency response function, usually a graph of amplitude versus frequency. This information is used to select an amplification circuit from a number of standardized circuits and/or to adjust the frequency response of the chosen electronic amplification circuit in order to boost the amplification at those frequencies where the user is the most hearing impaired.

As previously mentioned, the prior art BTE hearing aid instruments comprise an ear hook which houses an electronics module (i.e. a microphone, amplifier, receiver, etc.). The ear hook is worn on the outside of a user's ear and an ear mold, attached to the ear hook by tubing, is worn in the user's ear canal. The tubing conducts sound from the receiver of the ear hook to a bore in the ear mold for transmission to the user's eardrum. The ear hook amplifier typically includes a wideband frequency response. A 1981 paper published in the Journal of Speech and Hearing Disorder titled, "Earmold Options for Wideband Hearing Aides" by Mead C. Killian describes how this tubing of various sizes and geometries within the bore or sound channel of the ear mold can be selected to affect the high frequency response of the hearing aid.

U.S. patent publication US-2006-0115105-A1 to Brumback et al. discloses a method and apparatus for tailoring the audio frequency response of an ITE hearing instrument by altering the physical characteristics of the device to more accurately compensate for a user's specific hearing loss. More specifically, the bore of ITE hearing instrument, providing a passageway for the transmission of sound from the internal receiver to the user's eardrum, is custom-designed in various shapes, for example, a cone, to emphasize desired sound frequencies. This U.S. Patent Publication US-2006-0115105-A1 is hereby incorporated by reference.

U.S. Pat. No. 6,275,596 to Fretz et al. discloses an apparatus for varying the frequency response in a BTE hearing instrument. The disclosed apparatus is a variably-shaped "tip" disposed at the end of the ear canal tubing placed within the user's ear canal. The tip, which can be a separate component which fits over the end of the ear canal tube or is formed therein, may be flared or have an acoustic damper to smooth and reduce peaks in the frequency response of the hearing instrument device. Fretz et al. provide several examples of tips, including horn-shaped and step-change flaring tips, which alter and improve the frequency response in BTE hearing aid instruments in which an ear canal tube without an attached ear mold is used. U.S. Pat. No. 6,275,596 issued to Fretz et al. is hereby incorporated by reference.

New arrangements and methods for pre-selecting the frequency response in the ear hearing instrument are constantly desired. The invention described below is an improvement in the physical characteristics of a hearing instrument by tailoring the sound passage from the receiver of the device to the user's eardrum to emphasize desired frequencies. A new geometric shape for the tip of an ear canal tube is disclosed which provides a dramatic improvement in the frequency response of BTE-type hearing instrument devices.

3. Identification of Objects of the Invention

A primary object of this invention is to provide a method and apparatus for tailoring the audio frequency response of a behind the ear (BTE) hearing aid instrument by altering the physical characteristics of the device to more accurately compensate for a user's specific hearing loss characteristics.

Another object of the invention is to provide an improved BTE hearing aid instrument in which a passage of cylindrical shape between the receiver of the device and the outlet of the device is replaced at least in part by a passage of non-cylindrical shape in order to alter the sound frequency of the instrument.

Another object of the invention is to provide an improved BTE hearing aid instrument in which a passage of cylindrical shape between the receiver of the device and the outlet of the device is replaced at least in part by a passage of one or more conical shapes to emphasize desired frequency ranges.

Another object of the invention is to provide a method of producing an improved BTE hearing aid instrument in which the passage between the receiver of the device and the outlet of the device is at least partially of a non-cylindrical shape and where the non-cylindrical shape is formed by rapid prototyping.

Other objects, features, and advantages of the invention will be apparent to one skilled in the art from the specification and drawings herein.

SUMMARY OF THE INVENTION

The objects identified above are incorporated in a unique geometrically-shaped device disposed at the end of a BTE-type hearing aid instrument, which increases the overall gain (amplification) by 3 dB to 5 dB, especially in the upper frequencies. The device of the invention is a "tip," which may be used as an attachment to the end of the BTE-type hearing aid instrument or may be built into the tubing at the nozzle end of the BTE-type hearing aid instrument. The tip has an internal geometry consisting of one or more conical-like shapes arranged and designed such that the internal geometry tapers towards its end. The taper rate may be linear or nonlinear. The end of the tip, with its aperture for sound passage, is placed within the user's ear canal toward the user's eardrum.

The unique geometric shape of the tip provides a dramatic improvement in the frequency response of BTE-type hearing instrument devices and functions equally well no matter the type of tubing employed in the BTE-type hearing aid instrument (i.e. larger, traditional BTE tubing, thin tubing, etc.). The tip may be formed using a rapid prototyping process either concurrently with the BTE-type tubing or as an attachment to the BTE-type tubing. The tip partially occludes the ear canal, thereby manipulating the actual "in ear" response. Thus, the tip beneficially affects the overall gain (amplification) by manipulating the actual "in ear" response by increasing the user's ability to hear low to mid frequencies. By partially occluding the ear canal, the problems associated with feedback from the receiver to the amplifier are also mitigated.

BRIEF DESCRIPTION OF THE DRAWINGS

The invention is described in detail below on the basis of the preferred embodiments represented in the accompanying figures, in which.

DESCRIPTION OF A PREFERRED EMBODIMENT OF THE INVENTION

Figure 1:
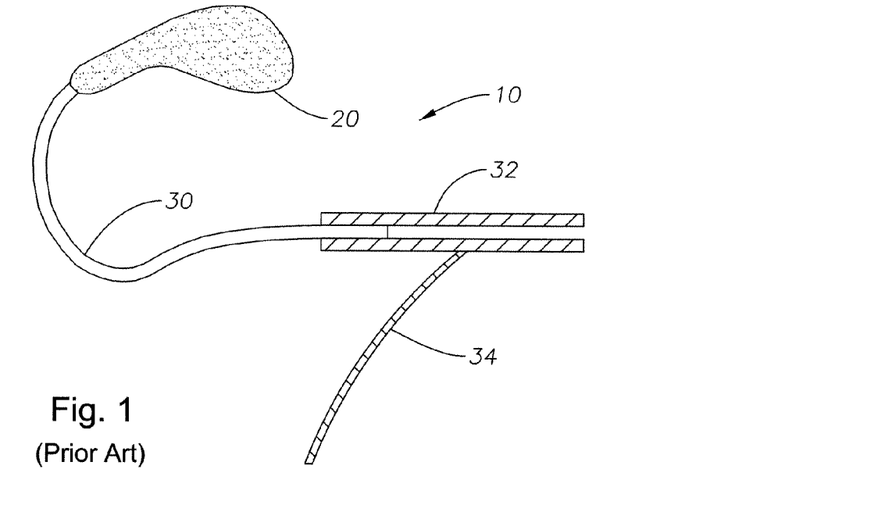
FIG. 1 is a perspective drawing of a prior art BTE-type hearing aid instrument having an ear canal tube without a tip.

FIG. 1 shows a prior art "behind-the-ear" (BTE) hearing aid device 10 with an "ear hook" 20 having an electronics module (i.e. a microphone, amplifier, receiver, etc.) contained therein (not shown). The ear hook 10 is worn primarily over and behind the user's ear. A hearing aid tube 30 extends from the ear hook 10 to an ear canal tube 32. The hearing aid tube 30 carries the amplified sound from the electronics module (not shown) within ear hook 20 to the ear canal tube 32. While ear hook 20 is worn over and behind the user's ear, ear canal tube 32 is placed into the user's ear canal for projecting the amplified sound toward the user's eardrum. Ear canal tube 32 may be a separate piece from hearing aid tube 30, which couples with hearing aid tube 30. Alternatively, ear canal tube 32 and hearing aid tube 30 may be constructed as a single tube. In any case, the ear canal tube or the portion of the tube disposed within the user's ear canal is constructed of a soft plastic or other material which will not irritate or scratch the lining of the user's ear canal. Original BTE designs used an ear mold (not shown) to hold the ear canal tube 32 in the proper position within the wearer's ear canal. As shown in FIG. 1, the more recent open ear canal BTE hearing aids 10 use a barb 34 or other rigid attachment that extends outwardly from the ear canal tube 32 and lodges behind the user's tragus. Barb 34 is predominately responsible for maintaining the proper positioning of the ear canal tube 32 within the wearer's ear canal. Barb 34 is also constructed of a soft plastic or other material to inhibit irritating or scratching the interior surface of the user's tragus. A characteristic of the more recent open ear canal BTE designs is that the wearer's ear canal is not occluded by an ear canal mold, which blocks the passage of nearly all unamplified sounds through the user's ear canal.

Figure 2A:
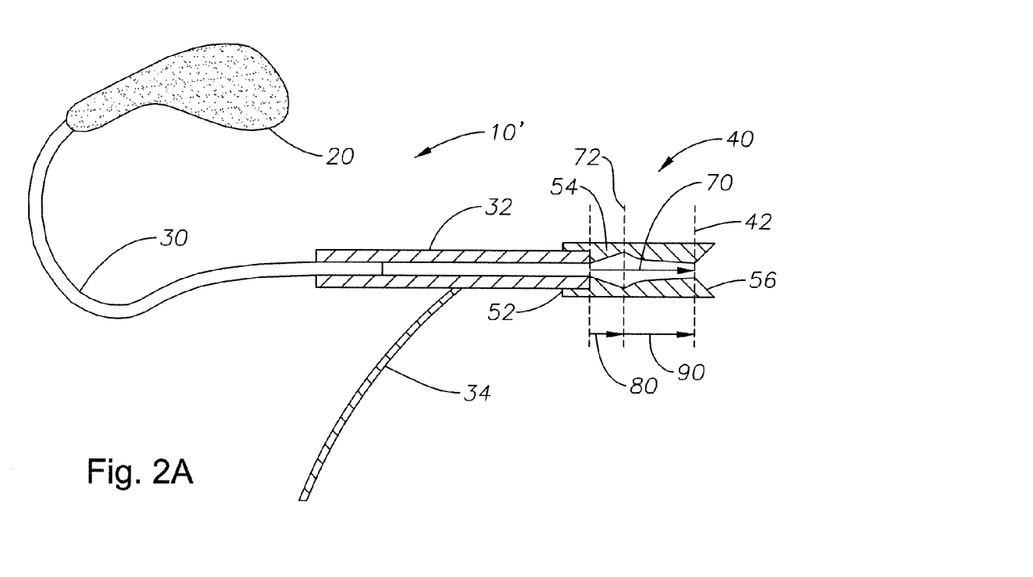
FIG. 2A is a perspective drawing of a tip according to a preferred embodiment of the invention in which the tip, disposed on the end of ear canal tubing connected to a BTE-type hearing aid instrument, has an internal geometry defining an acoustic path for sound passage from the ear canal tubing towards the user's ear drum.
Figure 2B:
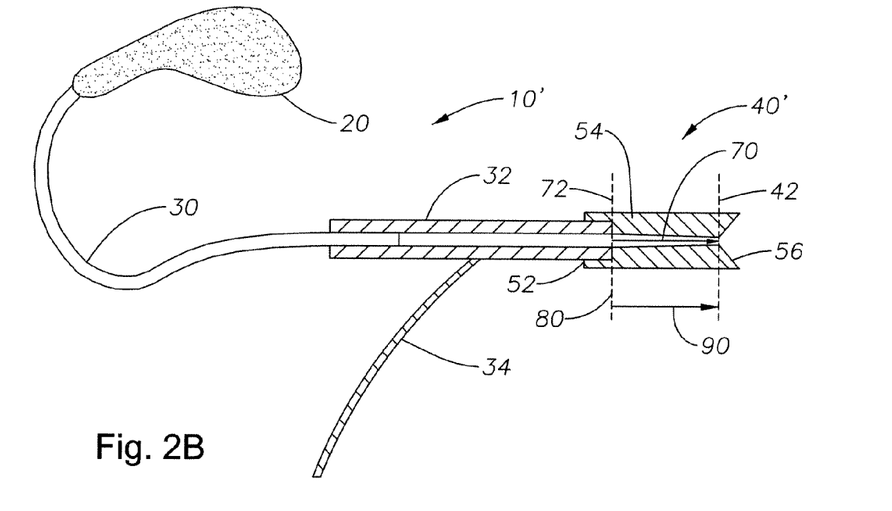
FIG. 2B is a perspective drawing of a tip according to an alternative preferred embodiment of the invention in which the tip, disposed on the end of the ear canal tubing connected to a BTE-type hearing aid instrument, has an alternative internal geometry defining an acoustic path for sound passage from the ear canal tubing towards the user's ear drum.

FIGS. 2A and 2B show a "behind-the-ear" (BTE) hearing aid device 10' according to preferred embodiments of the invention. A reference number designating a particular feature within one drawing will remain the same for the identical feature in all of the other drawings. BTE hearing device 10' is similar to the device 10 of FIG. 1, except that BTE hearing device 10' has a unique geometrically-shaped tip 40, 40' disposed at the end of the ear canal tube 32. The geometric shape of tip 40, 40' provides a dramatic improvement in the frequency response of BTE-style hearing instrument devices 10' by increasing the overall gain of sound transmitted therethrough by 3 dB to 5 dB, especially in the upper frequencies. Tip 40, 40' may be constructed as an attachment to the end of the BTE-type hearing aid instrument 10' or tip 40, 40' may be built into the tubing 30, 32 at the nozzle end of the BTE-type hearing aid instrument 10'.

Tip 40 is characterized by an acoustic interior path 70 that preferably has an entry path 80 and an exit path 90 as illustrated in FIG. 2A. The entry path 80 of tip 40 has a non-decreasing inside diameter throughout its variable length. As shown in FIG. 2A, entry path 80 of tip 40 preferably increases in inside diameter to a location 72 of largest inside diameter. Beginning at location 72, the exit path 90 has a shape of non-increasing inside diameter, such as a single cone shape or multiple cone shape, which tapers to its smallest diameter at end 42. End 42 is preferably followed by a beveled portion 56 which projects sound outward to the user's ear drum. The end 42 of tip 40 has an aperture therethrough for sound passage and is placed within the user's ear canal toward the user's eardrum.

Alternatively, tip 40' is characterized by an acoustic path 70 that preferably has an entry path 80 and an exit path 90 as illustrated in FIG. 2B. The entry path 80 of tip' has a non-increasing inside diameter of variable length. As shown in FIG. 2B, entry path 80 of tip 40' preferably has a negligible length such that entry path 80 is the location 72 of largest inside diameter within acoustic path 70. Exit path 90 of tip 40' has a shape of non-increasing inside diameter, such as a single cone shape or multiple cone shape, which tapers from a location 72 of largest inside diameter to its smallest diameter at end 42. End 42 is preferably followed by a beveled portion 56 which projects sound outward to the user's eardrum. The end 42 of tip 40' has an aperture therethrough for sound passage and is placed within the user's ear canal toward the user's eardrum.

The unique geometric shape of the tip 40, 40' provides a dramatic improvement in the frequency response of BTE-type hearing instrument devices 10, 10' and functions equally well no matter the type of tubing 30, 32 employed in the BTE-type hearing aid instrument (i.e. larger, traditional BTE tubing, thin tubing, etc.). The tip 40, 40' may be formed using a rapid prototyping process either concurrently with the BTE-type tubing 30, 32 or as an attachment to the BTE-type tubing 30, 32. As an attachment, tip 40, 40' may be coupled to tubing 30, 32 in any known manner but preferably tip 40, 40' slides onto tubing 30, 32 forming a seal between tubing 30, 32 and tip 40, 40' with or without an adhesive. Alternatively, tip 40, 40' may be designed so that tubing 30, 32 slides onto tip 40, 40' forming a seal between tubing 30, 32 and tip 40, 40'. In such case, the acoustic path 70 would run the length of tip 40, 40', except for the beveled portion 56 at end 42. Alternative coupling devices, such as gaskets, chemical sealants, etc., may be used to connect and seal tubing 30, 32 to tip 40, 40'. Preferably, however, tip 40, 40' is a removable attachment which couples to tubing 30, 32 so that tip 40, 40' may be detached for replacement or ear wax removal. Furthermore, tip 40, 40' may be either rigid or pliable. As an attachment to tubing 30, 32, tip 40, 40' may be constructed from a different material than tubing 30, 32 either for the comfort of the user or for the enhanced sound qualities imparted by a particular material.

Tip 40, 40' may be designed to partially occlude the ear canal, thereby providing more mid frequency gain. Thus, tip 40, 40' also beneficially affects the overall gain by manipulating the actual "in ear" response by increasing the user's ability to hear low to mid frequencies. By partially occluding the ear canal, the problems associated with feedback, i.e. amplified sound passage from the receiver, through tip 40, 40' and back to the amplifier around the outer surface of tip 40, 40', are also mitigated.

Figure 3:
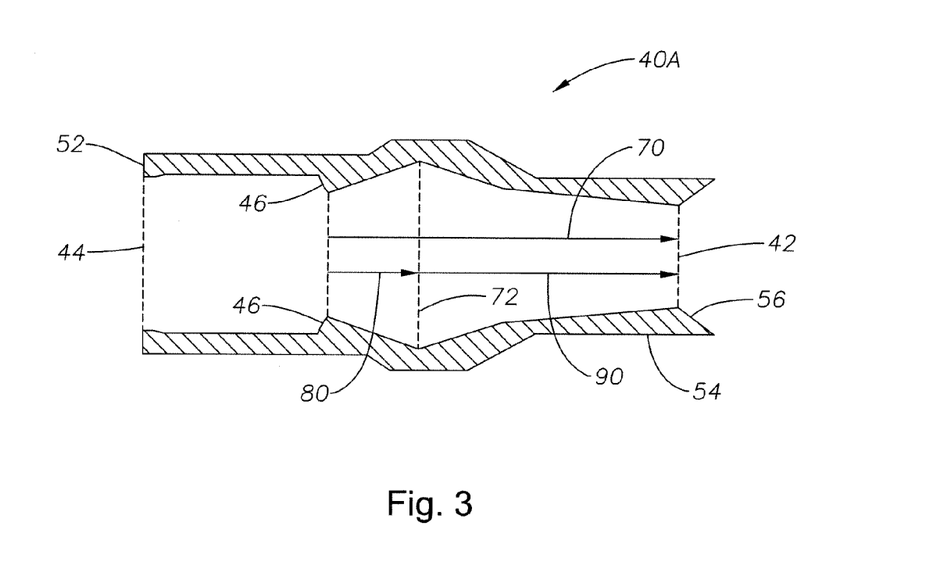
FIG. 3 illustrates a cut away side view of a tip which has an internal geometry similar to the tip illustrated in FIG. 2A and which provides a dramatic improvement in the frequency response of BTE-type hearing instrument devices.
Figure 4:
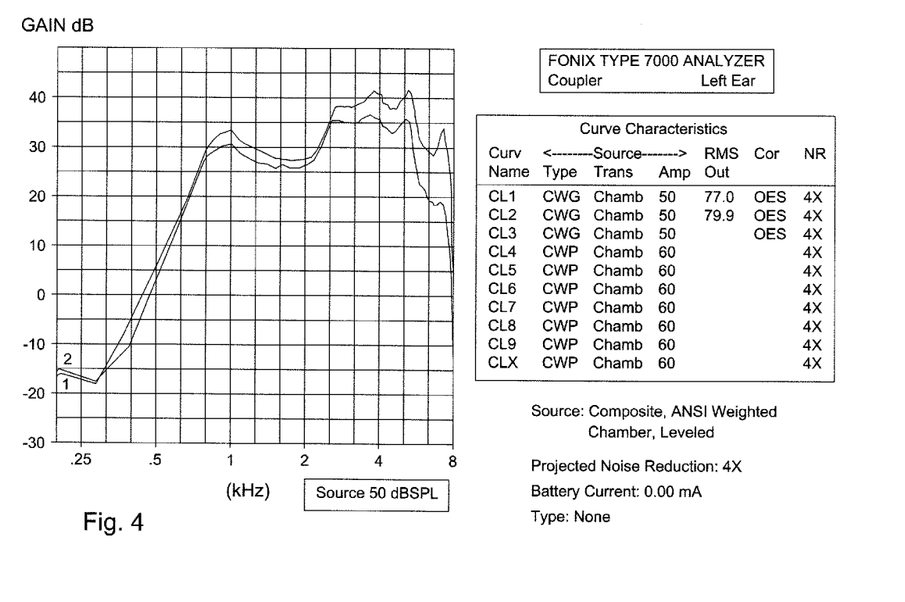
FIG. 4 presents a frequency response curve corresponding to the geometrically-optimized tip illustrated in FIG. 3.

The acoustic path 70 of tip 40, 40' (i.e. the sound passage), which includes the exit path 90 and optionally entry path 80, may be tailored and/or optimized to emphasize desired frequencies. FIG. 3 illustrates tip 40A, which is a preferred embodiment of tip 40 (FIG. 2A), having an acoustic path 70 characterized by an entry path 80 and an exit path 90. The entry path 80 of tip 40A increases in inside diameter to a location 72 of largest inside diameter. Beginning at location 72, the exit path 90 has a multiple-cone shape which tapers to its smallest inside diameter at end 42. End 42 is preferably followed by a beveled portion 56 which projects sound outward to the user's ear drum. Tip 40A is shown in FIG. 3 as a removable attachment in which tubing 30, 32 (FIG. 2A) couples to tip 40A by sliding the end of tubing 30, 32 through aperture 44 until tubing 30, 32 abuts optional tubing seat 46. Amplified sound from the electronics module (not shown) of ear hook 20 passes through tubing 30, 32 and into the acoustic path 70 of tip 40A. The unique geometric shape of acoustic path 70, i.e. an entry path 80 with an increasing inside diameter and an exit path 90 with a decreasing inside diameter, modifies the amplified sound such that a gain of 3 dB to 5 dB is experienced in the mid frequency range. FIG. 4 illustrates a frequency response curve for the tip 40A of FIG. 3. The addition of tip 40A at the end of tubing 30, 32 provides an increase in gain at the mid frequency range that also allows the BTE hearing aid instrument 10' (not shown) to track the insertion gain to a much greater extent than without the aid of tip 40A. The response curve of FIG. 4 shows an increase in gain of approximately 3 dB to 5 dB in the mid frequency range (i.e. 3 to 8 kHz).

Figure 5:
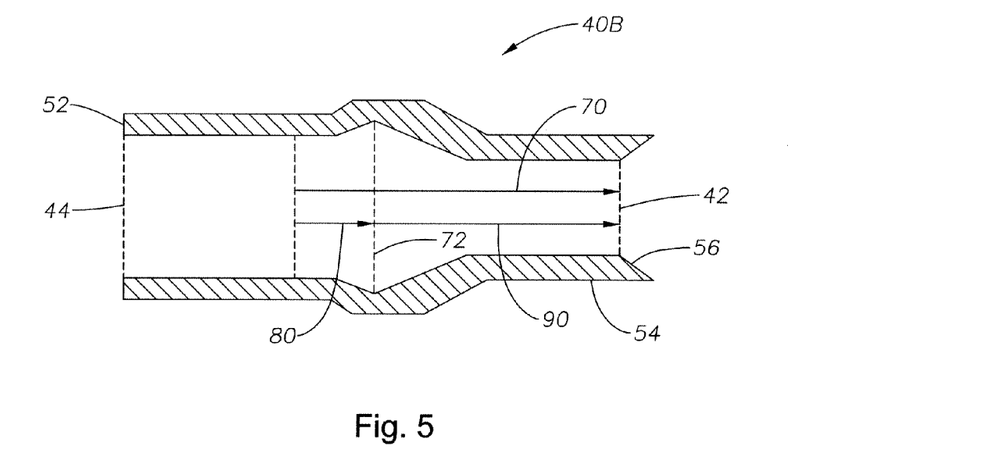
FIG. 5 illustrates a cut away side view of a tip which has an alternative internal geometry from the tip illustrated in FIG. 3 and which provides a dramatic improvement in the frequency response of BTE-type hearing instrument devices.
Figure 6:
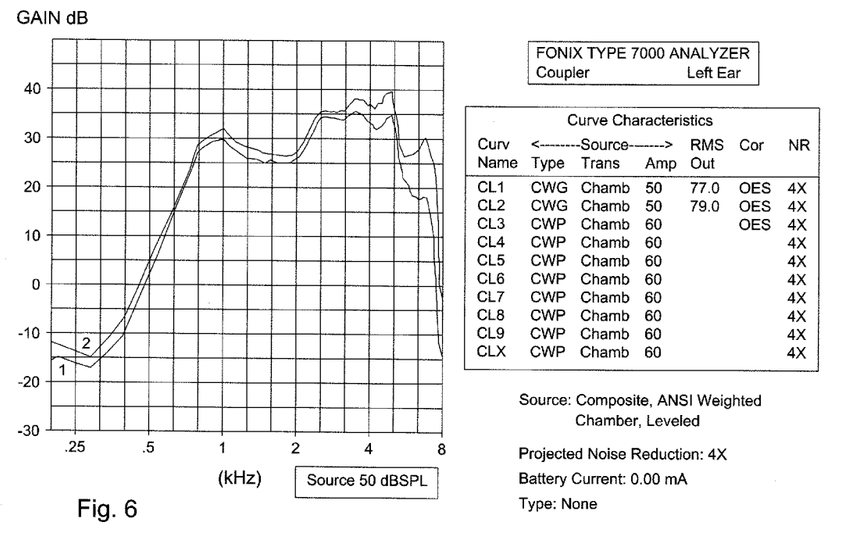
FIG. 6 presents a frequency response curve corresponding to the geometrically-optimized tip illustrated in FIG. 5.

FIG. 5 illustrates tip 40B, which is an alternative preferred embodiment of tip 40 (FIG. 2A), in which entry path 80 and exit path 90 have slightly different inside geometries. Beginning from location 27, the exit path 90 has a first conical shape followed by a cylindrical shape near its end 42. The tip 40B of FIG. 5 also lacks optional tubing seats 46. Tip 40B may be coupled to tubing 30, 32 (FIG. 2A) in any known manner but preferably tip 40B slides onto tubing 30, 32 forming a seal between tubing 30, 32 and tip 40B with or without adhesives. Except for the lack of optional tubing seats 46 and the cylindrically shaped exit path 90 near its end 42, the tip 40B shown in FIG. 5 is identical to the tip 40A shown in FIG. 3. The unique geometric shape of the acoustic pathway 70, i.e. the entry path 80 combined with the exit path 90, modifies the amplified sound such that a gain of 3 dB to 5 dB is experienced in the mid frequency range. FIG. 6 illustrates a frequency response curve for the tip 40B of FIG. 5. The addition of tip 40B at the end of tubing 30, 32 provides an increase in gain at the mid frequency range (i.e., 3 to 8 kHz) that also allows the BTE hearing instrument (not shown) to track the insertion gain to a much greater extent than without the aid of tip 40B.

Figure 7:
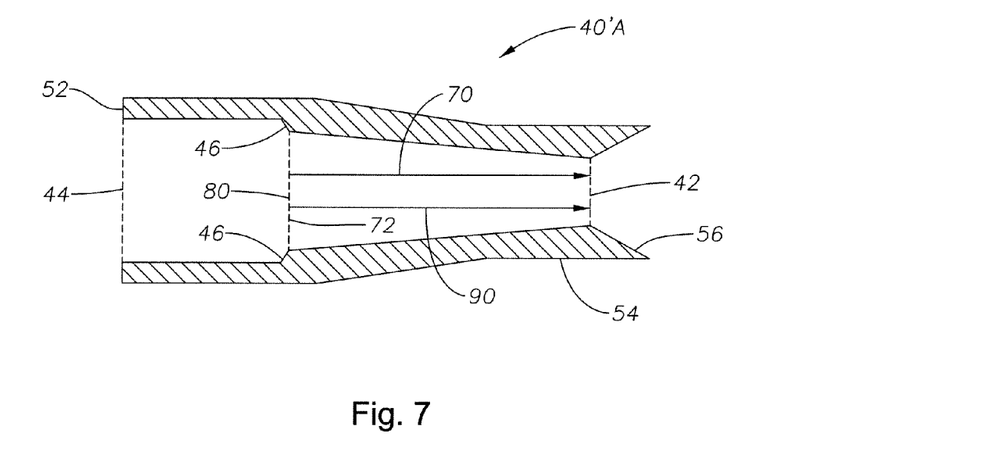
FIG. 7 illustrates a cut away side view of a tip which has an internal geometry similar to the tip illustrated in FIG. 2B and which provides a dramatic improvement in the frequency response of BTE-type hearing instrument devices.
Figure 8:
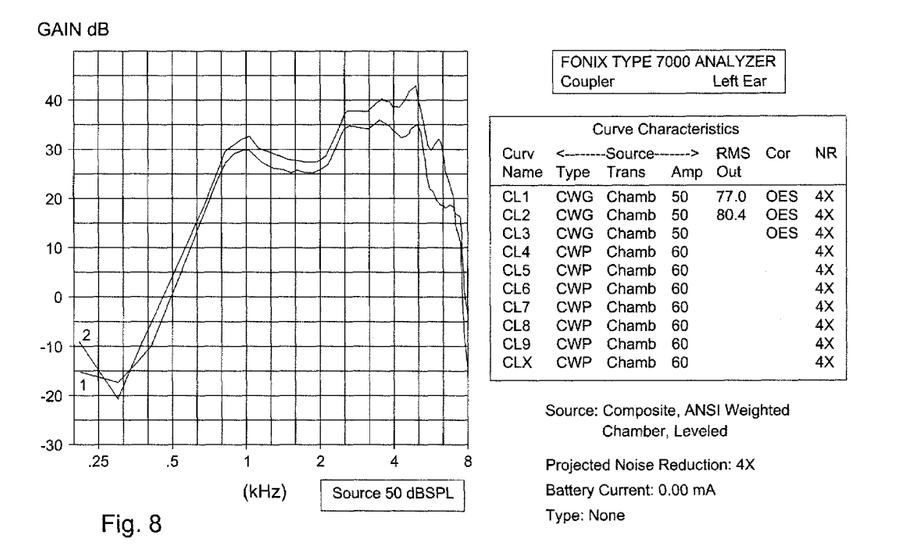
FIG. 8 presents a frequency response curve corresponding to the geometrically-optimized tip illustrated in FIG. 7.

FIG. 7 shows tip 40'A, which is a preferred embodiment of tip 40' (FIG. 2B), having an acoustic path 70 characterized by an entry path 80 and an exit path 90. The entry path 80 of tip 40'A preferably has a non-increasing inside diameter of negligible length. Thus, the entry path 80 is the location 72 of largest inside diameter within acoustic path 70. Beginning at location 72, the exit path 90 has a cone shape which tapers to its smallest inside diameter at end 42. End 42 is preferably followed by a beveled portion 56 which projects sound outward to the user's ear drum. Tip 40'A is shown in FIG. 7 as a removable attachment in which tubing 30, 32 (FIG. 2B) couples to tip 40'A by sliding the end of tubing 30, 32 through aperture 44 until tubing 30, 32 abuts optional tubing seat 46. Amplified sound from the electronics module (not shown) of ear hook 20 passes through tubing 30, 32 and into the acoustic path 70 of tip 40'A. The unique geometric shape of acoustic path 70, i.e. an entry path 80 of negligible length and an exit path 90 with a decreasing inside diameter to its end, modifies the amplified sound such that a gain of 3 dB to 5 dB is experienced in the mid frequency range. FIG. 8 illustrates a frequency response curve for the tip 40'A of FIG. 7. The addition of tip 40'A at the end of tubing 30, 32 provides an increase in gain at the mid frequency range that also allows the BTE hearing aid instrument 10' (not shown) to track the insertion gain to a much greater extent than without the aid of tip 40'A. The response curve of FIG. 8 shows an increase in gain of approximately 3 dB to 5 dB in the mid frequency range (i.e. 3 to 8 kHz).

As the embodiments of the invention described above demonstrate, varying the internal geometry of tip 40, 40' can significantly alter the frequency response of amplified sound from the BTE hearing instrument 10'. Varying the physical geometry of tip 40, 40' is also an easier and more cost effective method of tailoring the BTE hearing instrument 10, 10' to emphasize desired sound frequencies than by making electronic modifications and/or adjustments Thus, tip 40, 40' is preferably optimized with a geometry having particular dimensions to enhance desired audio frequencies.

The effects of tip geometry on frequency response can be determined mathematically and are preferably modeled by computer program. Alternatively, tip geometry effects may be empirically determined based on testing a number of varying bore designs and dimensions. The acoustic design of the tip 40, 40' is dependent on a number of factors including, but not limited to, the desired frequency response and the acoustic qualities of the tip material.

More specifically, the frequency response of a particular tip geometry is dependant upon variables that characterize the acoustic path 70 from its entry 80 to its exit 90. One such variable is the maximum inside diameter 72 that is encountered along the acoustic path 70 from the entry path 80 to exit path 90. For example, the location 72 of maximum inside diameter may be placed anywhere along acoustic path 70. If location 72 is placed near the entrance of acoustic path 70 (i.e. entry path 80 has a shorter length than exit path 90), then the length of exit path 90 can be made longer and any change in the slope of exit path 90 can be made more gradual. Conversely, if location 72 is placed nearer the exit of acoustic path 70 (i.e. exit path 90 has a shorter length than entry path 80), then the length of entry path 80 can be made longer and any change in the slope of entry path 80 can be made more gradual. Thus, the entry slope to and exit slope from the maximum inside diameter 72, and consequently the frequency response characteristics of the tip 40, 40', can be affected by the placement of the location 72 of maximum inside diameter.

The entry and exit slope angles are additional variables that characterize the acoustic path 70 from its entry 80 to its exit 90 and have a significant affect upon tip geometry and the frequency response of the hearing instrument 10'. For example, different internal tip geometries, i.e. cones, inverted cones, etc., have different effects on the frequency response of the hearing instrument 10'. Thus, the entry and exit slope angles may be varied linearly or nonlinearly so as to alter the frequency response characteristics of the tip 40, 40' as desired.

As previously illustrated in FIGS. 3, 5, and 7, exit path 90 generally tapers from a location 72 of maximum inside diameter to its smallest diameter at end 42 through various internal geometries. The taper angle(s) through exit path 90 can be adjusted to alter and optimize the desired frequency response. An exit path taper angle between 3 and 20 degrees is preferable, between 3 and 12 degrees is more preferable, and between 3.5 and 6.5 degrees is most preferable, with the latter range having produced the best frequency responses for low to mid level frequencies. Likewise, the entry path slope(s) can also be adjusted to alter and optimize the desired frequency response. If the entry path 80 is designed with a slope, the angle of the entry path slope is preferably between 2 and 24 degrees. More preferably, however, the entry path slope is designed to optimize the length and slope angle of the exit path 90.

The tip length is another variable that characterizes the acoustic path 70 from its entry 80 to its exit 90 and has a significant affect on the frequency response of the hearing instrument 10'. Tip length affects the overall tip geometry. Unfortunately, tip length is also limited by normal human anatomy. Thus, tip length is preferably designed to be between 3 mm and 10 mm. However, a spiral shaped can be provided to increase tip length without increasing the physical length of the tip 40, 40'.

The overall frequency response of a hearing instrument 10, 10' is the product of the frequency response created by the hearing instrument circuitry (i.e., amplification, etc.) and the frequency response created by the physical characteristics of the sound passageway (i.e., tip geometry, etc.) through the hearing instrument 10, 10'. Thus, the overall frequency response of a hearing instrument 10, 10' can be tailored and optimized to correct for a user's hearing loss by changes to the electronic circuitry, the physical characteristics of the acoustic passageways or a combination thereof. Heretofore, adjusting the in-the-ear hearing instrument electronic circuitry has been the primary method of emphasizing desired audio sound frequencies. A preferred embodiment of the present invention, therefore, is to arrange and design the physical characteristics of a BTE-type hearing instrument's acoustic passageways in combination with adjustments to its electronic circuitry to produce a predetermined overall frequency response.

The initial manufacture of a custom-shaped tip 40, 40', either as an attachment to tubing 30, 32 or as an integrated component of tubing 30, 32, for testing purposes is not economically feasible when hearing aids are hand made, because the angle and geometry of tip 40, 40' must be constructed with the utmost precision. However, with the advent of rapid prototyping technology, also referred to as rapid manufacturing technology, geometric manufacturing limitations are greatly reduced. Each geometrically-optimized tip 40, 40' can now easily be shaped and manufactured to produce the desired acoustic response. As previously mentioned, the geometry of tip 40, 40' is designed and optimized mathematically using a computer. Therefore, through the use of a rapid prototyping technique, great precision with respect to the desired angle, shape, and frequency response of a selected tip geometry can be achieved.

Rapid prototyping techniques have in common the principle of additive or subtractive creation of tangible three-dimensional parts from data provided either by computer model or direct duplication. A more complete listing of these techniques is available in Terry Wohlers' *Wohlers Report 2003*, but the major methods are described briefly in the following paragraphs.

Selective Laser Sintering is based upon the principle of applying laser energy to a powderous material in order to fuse the material at the point of contact with the laser. The laser traces a cross sectional slice of the object to be created thereby causing a cross sectional layer of the object desired to be created. After completion of the first layer, more powderous material is placed atop the fused layers, and the next cross sectional layer is created in the same manner. The process is repeated until the fully developed part is formed.

Stereolithography is similar to Selective Laser Sintering, but rather than fusing powder to form objects, this process entails solidifying a photosensitive resin with laser energy. The laser traces the outline of the object thereby creating a solidified cross section of a part of the object to be created. After the section is created, the layer is lowered into the resin, and the step is repeated. The process continues until the desired object is completed.

Fused Deposition Modeling and other similar processes, such as the Thermojet Technique, include the steps of depositing a cross sectional layer of thermoplastic or photosensitive plastic material, solidifying the layer by means of either temperature regulation or light exposure, and then laying then next layer upon the first. The process is repeated until the desired object is produced.

Laminated Object Manufacturing is the process of cutting sheets of plastic or paper with a laser, cutting tool, or heat source, cross sectional layer by cross sectional layer, and fusing the sheets together at the point at which they are sliced to produce the desired object.

The Drop on Powder Method includes the steps of depositing a binding agent upon a powderous material and binding it together to create a cross sectional layer of the object to be produced. An additional layer of the powderous material is then laid upon the first layer and that layer is bound together. The process is repeated until the desired object is formed.

The Visible Light Masking Method is a preferred method of producing ear canal tips, and entails projecting an image of a cross section of the object or objects to be created upon a photo sensitive resin or liquid photopolymer. The visible light cures the layer at the point of projection, and then the solidified layer is separated from the point of projection which allows more photosensitive resin to fill in where the cured layer was previously located. Next, the light is again projected thereby solidifying the second layer. The process is repeated until the desired object is formed.

After tip 40, 40' is manufactured using a rapid prototyping technique, tip 40, 40' is then tested to ensure that the desired acoustic response is actually produced by its custom-shaped internal geometry. Tips 40, 40', which produce the same desired acoustic response, may be subsequently manufactured using either a rapid prototyping technique or more conventional mold casting techniques, such as plastic casting. In creating a mold for these conventional mold casting techniques, the dimensions of internal tip geometries producing desired acoustic responses may be obtained from the tips 40, 40', which were originally manufactured using rapid prototyping techniques.

A method of producing a BTE-type hearing ear instrument 10' with physically-tailored frequency response characteristics includes first conducting a full audiometric evaluation of the user. A hearing screening test is performed to determine air and bone conduction thresholds at critical frequencies. The complete audiometric evaluation produces an amplitude versus frequency response representative of the patient's hearing. Such information is used to select the proper amplification circuitry, design the internal geometry of tip 40, 40' to emphasize certain frequencies, and program the amplification circuit of the tailored hearing aid instrument to create an overall frequency response which compensates for any user hearing deficiencies.

Next, the tip 40, 40' is manufactured using a rapid prototyping technique. The internal geometry of tip 40, 40' is designed and optimized mathematically using a computer based upon the results of the full audiometric evaluation previously conducted. Computer-aided design software creates a three-dimensional mathematical model for the interior surface of tip 40, 40'. The three-dimensional mathematical model is then modified to include a exterior surface of tip 40, 40' and a tube seating 46 to accommodate tubing 30, 32. This modified model is then used to manufacture the geometrically-optimized tip 40, 40' using one of the rapid prototyping techniques described above. The Visible Light Masking Method, which uses a machine manufactured by Envisiontec, GmbH of Germany, is currently preferred. Alternatively, the tip 40, 40' is manufactured through a conventional mold casting technique, such as plastic casting, using the modified model as a basis for making the mold. Final assembly of the completed BTE-type hearing aid instrument 10' includes adding the desired electronics module (not shown) into ear hook 20, attaching tubing 30, 32 to ear hook 20 and coupling tip 40, 40' to tubing 30, 32. The BTE-type hearing aid instrument 10' is then inspected, programmed, tested, and finally delivered to the client.

The abstract of the disclosure is written solely for providing the United States Patent and Trademark Office and the public at large with a description to determine quickly from a cursory inspection the nature and gist of the technical disclosure, and it represents solely a preferred embodiment and is not indicative of the nature of the invention as a whole.

While the preferred embodiment of the invention has been illustrated in detail, it is apparent that modifications and adaptations of the preferred embodiment will occur to those skilled in the art. Such modifications and adaptations are in the spirit and scope of the invention as set forth in the following claims:

What is claimed is:

1. An acoustic enhancement device (40, 40') comprising,
   a housing (54) arranged and designed for insertion in an ear canal, said housing (54) having a first tip (42) adapted to face an ear drum when said housing (54) is inserted into said ear canal, said housing (54) also having a second tip (52) with an aperture (44) therein and
   a bore (70, 80, 90) formed in said housing (54) and positioned between said first tip (42) and said second tip (52), whereby a sound path is created from said second tip (52) through said bore (70, 80, 90) toward said ear drum; said bore (70, 80, 90) having a bore geometry arranged and designed to alter a frequency response of sound passing therethrough, said bore geometry having a maximum inside diameter (72) between said second tip (52) and said first tip (42) which is greater than an inside diameter at said first tip (42) and said second tip (52), said bore geometry characterized by an entry path (80) having inside diameters varying linearly as a function of bore length from said maximum inside diameter (72) toward said second tip (52) and an exit path (90) having inside diameters varying linearly as a function of bore length from said maximum inside diameter (72) toward said first tip (42).

2. The device of claim 1 wherein,
   said bore geometry is further characterized by non-increasing inside diameters as a function of bore length from said maximum inside diameter (72) towards said second tip (52) and non-increasing inside diameters as a function of bore length from said maximum inside diameter (72) towards said first tip (42).

3. The device of claim 1 wherein,
said exit path (90) forms an exit path taper angle between said maximum inside diameter (72) and said first tip (42) of between three and twenty degrees, said angle selected to produce a predetermined frequency response of sound passing through said bore (70, 80, 90).

4. The device of claim 1 wherein,
said bore geometry is further characterized by inside diameters that linearly decrease as a function of bore length from said maximum inside diameter (72) towards said second tip (52) and inside diameters that linearly decrease as a function of bore length from said maximum inside diameter (72) towards said first tip (42).

5. The device of claim 1 wherein,
said bore geometry has a length between said second tip (52) and said first tip (42) which is selected to produce a predetermined frequency response of sound passing therebetween.

6. The device of claim 1 wherein,
said housing (54) couples to tubing (30, 32) connected to a hearing instrument (10, 10') by inserting said tubing (30, 32) through an aperture (44) said housing (54) until said tubing (30, 32) abuts a tubing seat (46).

7. The device of claim 6 wherein,
said tubing (30, 32) and said housing (54) are manufactured as one integral piece.

8. The device of claim 1 wherein,
said housing (54) with said bore geometry is formed by a rapid prototyping process.

9. The device of claim 6 wherein,
said hearing instrument device (10, 10') is a hearing aid.

10. An ancillary hearing aid device (40, 40') comprising,
a housing (54) arranged and designed for insertion in an ear canal, said housing (54) having a first tip (42) adapted to face an ear drum when said housing (54) is inserted into said ear canal, said housing (54) also having a second tip (52) adapted to couple to a hearing aid (10, 10') and
a bore (70, 80, 90) formed in said housing (54) and positioned between said first tip (42) and said second tip (52), whereby a sound path is created from said second tip (52) through said bore (70, 80, 90) toward said ear drum; said bore (70, 80, 90) having a bore geometry arranged and designed to alter a frequency response of sound passing therethrough, said bore geometry having a maximum inside diameter (72) between said second tip (52) and said first tip (42) which is greater than an inside diameter at said first tip (42) and said second tip (52); said bore geometry characterized by an entry path (80) having inside diameters that proceed linearly as a function of bore length from said maximum inside diameter (72) towards said second tip (52) and an exit path (90) having inside diameters that proceed linearly as a function of bore length from said maximum inside diameter (72) towards said first tip (42).

11. The device of claim 10 wherein,
said bore geometry is further characterized by non-increasing inside diameters as a function of bore length from said maximum inside diameter (72) towards said second tip (52) and non-increasing inside diameters as a function of bore length from said maximum inside diameter (72) towards said first tip (42).

12. The device of claim 10 wherein,
said exit path (90) forms an exit path taper angle between said maximum inside diameter (72) and said first tip (42) of between three and twenty degrees, said angle selected to produce a predetermined frequency response of sound passing through said bore (70, 80, 90).

13. The device of claim 10 wherein,
said bore geometry is further characterized by inside diameters that linearly decrease as a function of bore length from said maximum inside diameter (72) towards said second tip (52) and inside diameters that linearly decrease as a function of bore length from said maximum inside diameter (72) and towards said first tip (42).

14. The device of claim 10 wherein,
said bore geometry has a length between said second tip (52) and said first tip (42) which is selected to produce a predetermined frequency response of sound passing therebetween.

15. The device of claim 10 wherein,
said housing (54) couples to tubing (30, 32) connected to said hearing aid (10, 10') by inserting said tubing (30, 32) through an aperture (44) said housing (54) at said second tip (52) until said tubing (30, 32) abuts a tubing seat (46).

16. The device of claim 15 wherein,
said tubing (30, 32) and said housing (54) are manufactured as one integral piece.

17. The device of claim 10 wherein,
said housing (54) with said bore geometry is formed by a rapid prototyping process.

18. A method of making an acoustic enhancement device (40, 40') which includes a shell (54) with a bore (70, 80, 90) formed therein arranged and designed to alter a frequency response of sound passing therethrough between a hearing instrument device (10, 10') and an ear drum, said method comprising the steps of:
forming said shell (54) which is arranged and designed for insertion in an ear canal, said shell (54) having a first tip (42) adapted to face said ear drum when said shell (54) is inserted into said ear canal and a second tip (52) with an aperture (44) therein;
selecting a geometry of said bore (70, 80, 90) to produce a predetermined frequency response of sound passing therethrough; said geometry having a maximum inside diameter (72) between said second tip (52) and said first tip (42) which is greater than an inside diameter at said first tip (42) and said second tip (52); said geometry characterized by an entry path (80) having inside diameters that proceed linearly as a function of bore length from said maximum inside diameter (72) towards said second tip (52) and an exit path (90) having inside diameters that proceed linearly as a function of bore length from said maximum inside diameter (72) towards said first tip (42); and
forming said selected bore geometry in said shell (54).

19. The method of claim 18 wherein,
said forming steps use a rapid prototyping process.

20. The method of claim 18 wherein,
said geometry is characterized by non-increasing inside diameters as a function of bore length from said maximum inside diameter (72) towards said second tip (52) and non-increasing inside diameters as a function of bore length from said maximum inside diameter (72) towards said first tip (42).

* * * * *